Nov. 28, 1961  R. W. GRETTER  3,010,631
CABLE ENGINE LOAD DISTRIBUTION MEANS
Filed Dec. 24, 1958  2 Sheets-Sheet 1

INVENTOR
R. W. GRETTER
BY
*R. F. Stoddard*
ATTORNEY

Nov. 28, 1961  R. W. GRETTER  3,010,631
CABLE ENGINE LOAD DISTRIBUTION MEANS
Filed Dec. 24, 1958  2 Sheets-Sheet 2
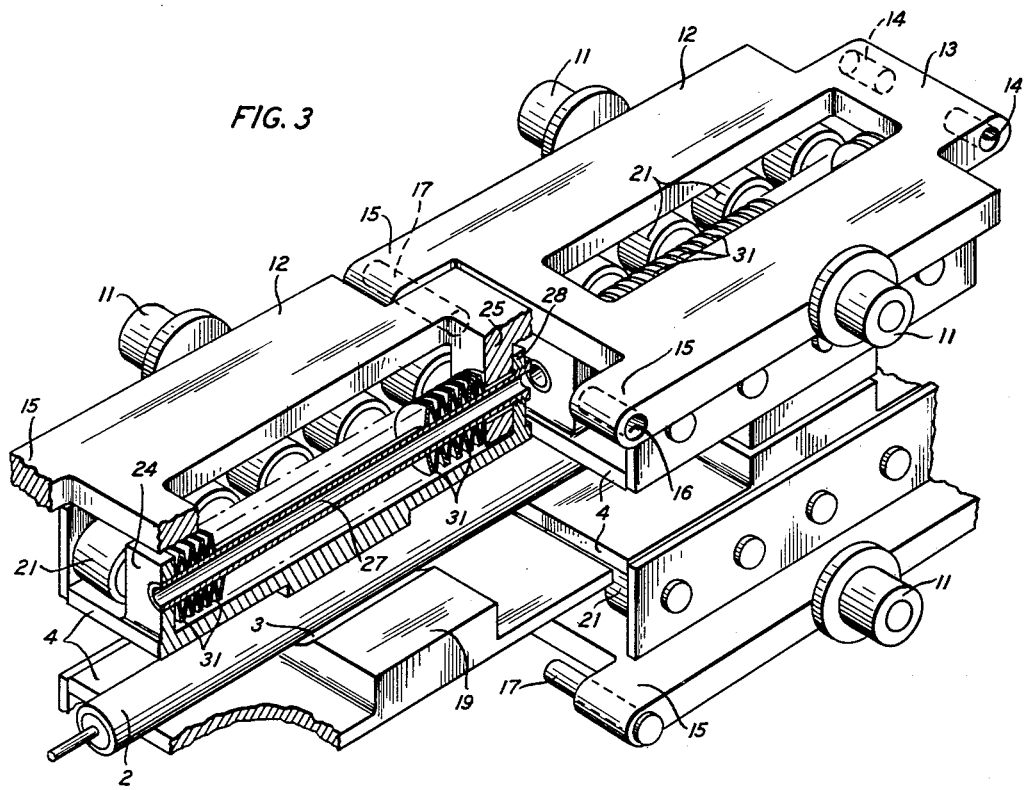
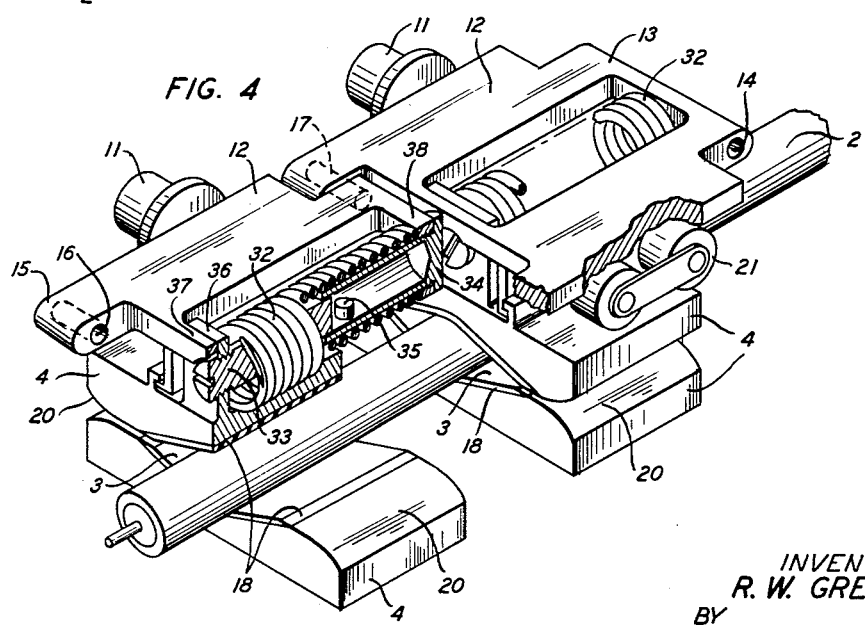
INVENTOR
R. W. GRETTER
BY
B. S. Stoddard
ATTORNEY

3,010,631
CABLE ENGINE LOAD DISTRIBUTION MEANS
Ralph W. Gretter, Mountainville, N.J., assignor to Bell
Telephone Laboratories, Incorporated, New York, N.Y.,
a corporation of New York
Filed Dec. 24, 1958, Ser. No. 782,905
8 Claims. (Cl. 226—172)

This invention relates to cable-handling equipment, such as cable engines, and, more particularly, to means for controlling the distribution of cable tensile load in cable engines having linearly translatable means comprising spaced devices for serially gripping a cable. The invention is especially useful when it is applied to a caterpillar cable engine employed in laying or recovering ocean cable of the armorless type.

Heretofore, ocean or undersea communication cable has been constructed with a relatively heavy external protective sheath or armor including, for example, a multiplicity of spirally wrapped layers of steel wire or tape. In addition to protecting the cable, the armor also functions as the chief strength member for the cable because it possesses sufficient strength to withstand the high mechanical tensions involved in the processes of laying or recovering ocean cable. Due to the sturdy nature of this armored cable, it has been satisfactorily handled on board a ship by comparatively simple means, such as by utilizing a drum around which the cable is wrapped several times.

Recently developed ocean cable differs from that described above in that its outer covering is formed of a suitable plastic material, such as polyethylene. This newer type of ocean cable is consequently known as armorless cable. Another difference between these two types of ocean cable is that armorless cable does not have its main strength member located on its external surface but, instead, has it embedded in its center portion or core.

One example of satisfactory form of armorless ocean cable is a two-conductor coaxial cable having an outside diameter of the order of one inch and fabricated around a central strength core member having a diameter of approximately three-tenths of an inch. This core member is constituted by wire rope formed of stranded steel wires, having an average ultimate strength of 300,000 pounds per square inch, to provide an approximate breaking strength of 15,000. The inner coaxial conductor is constituted by a thin sheath of a suitable high-conductivity metal, such as copper, in the shape of a tube or spirally wrapped tape and formed so tightly around the core member as to be virtually integral therewith. This inner conductor is closely surrounded by suitable intermediate dielectric material, such as polyethylene butyl compound, molded into a cylindrical shape. The outer coaxial conductor is constituted by a similar high-conductivity metal, such as copper, which may conveniently be in the form of one or more tapes applied tightly around the intermediate dielectric material. This outer conductor is protected by a thin external coating approximately two-tenths of an inch thick of suitable insulating material, such as polyethylene or polyvinyl chloride.

A desirable feature of armorless ocean cable is that, since the steel strength member is embedded in the center of the cable, it is removed as far as possible from sources of corrosion so that its breaking strength will remain unimpaired over a long period of years. Another desirable feature of armorless cable is that a greater quantity of it can be carried at one time by a cable-laying ship due to the fact that it is substantially smaller and lighter than conventional armored ocean cable.

During the operations of laying or recovering ocean cable, a portion of the cable is suspended between the cable-handling ship and the bottom of the ocean. The weight of this suspended portion produces considerable tension in the cable, especially when these operations are performed in water that is several miles deep. Accordingly, it is necessary to employ some suitable type of cable-handling device for transferring this tension to the hull of the ship. Any such cable-handling device is dependent upon frictional shear stresses exerted on the surface of the cable. Due to the nature of the friction phenomenon, these shear stresses are, in turn dependent upon imposed loads that are normal to the cable surface. Thus, by using a cable-handling device for applying axial shear loads to the surface of the cable, it is possible to transfer the cable tension to the hull of the ship.

In selecting a device for handling armorless ocean cable, it is advisable to avoid using a facility that would subject the cable to radial bends which might crack the plastic material or deform the configuration of the coaxial conductors. Therefore, it is preferable to employ means that will grip or otherwise make contact with a relatively long, straight section of the cable without imposing any bending force upon the cable. A device that fulfills this requirement is a caterpillar cable engine having oppositely disposed mating tracks comprising a multiplicity of juxtaposed gripping units so arranged as to permit the cable to pass through the engine along a path of travel which is essentially a straight line. In an engine of this type, the total gripping force exerted by the engine is distributed among a relatively large number of individual gripping units, such as gripper blocks or shoes, so that the gripping area of each unit is responsible for only a small fraction of the total load. Since each mating pair of cable-gripping units assumes only a small portion of the total load, the length of the mating section of the caterpillar tracks is designed to be sufficient to include enough pairs of gripping units for absorbing the total loading tension among them without damage to the cable.

Although the cable-gripping forces can be applied over a relatively long section of cable by using a multiple gripper caterpillar cable engine as explained above, there still remains the problem of distributing the cable tensile load evenly over the entire length of the mating track section of the engine. In other words, the frictional engagement between the above-mentioned gripping units and the surface of the cable must be such as to uniformly transmit the cable tension to or from the high strength core in the cable. This should be performed in such a manner that the gripping forces normal to the cable are prevented from becoming so great as to crush the plastic dielectric material or distort the configuration of the coaxial conductors. Also, the longitudinal forces exerted by the engine upon the cable should be kept from becoming so large as to deform the cable by causing slippage of its various coaxial portions with relation to each other.

In considering this problem of preventing such damage to the cable, it should be noted that the shear stresses are transmitted to the main strength core member by way of the unbonded interfaces between the several components of the coaxial structure. During this process, the chief hazardous points are those between the coaxial conductors and the plastic dielectric material since there is no cohesion between the inner and outer copper conductors and the intermediate plastic dielectric material. Due to this lack of cohesion, the plastic dielectric might slip with respect to the inner and outer copper conductors when excessive axial force is applied.

The maximum shear stress which can be developed between a gripper unit and the cable is limited by the normal stress and by the coefficient of friction. Normal stress is propagated through the plastic dielectric with comparatively little change. However, since the inner area of this material is smaller than the outer area by a factor equal to the radius ratio, the limiting shear handling capacity at the interface between the intermediate dielectric material and the inner coaxial conductor will be reached before it occurs at the interface between this dielectric and the outer coaxial conductor. When this limiting shear transfer condition is reached, slipping may occur all along the above-mentioned interface. In order to avoid this slip condition, each gripping unit must be designed so that it will take no more than a fixed load. This is known as the shear limiting concept.

Accordingly, an object of this invention is to prevent an armorless cable from becoming damaged by shear stresses while it is being handled under tension.

Another object of this invention is to provide shear-limiting means for use in the handling of armorless cable.

A more specific object of the invention is to provide means for limiting longitudinal shear within an armorless cable during the handling thereof under tension.

A still more specific object of the invention is to provide means for limiting longitudinal shear between the inner coaxial conductor of an armorless communication cable and its surrounding plastic dielectric material during the handling of the cable under tension.

An additional object of the invention is to provide means for controlling the distribution of cable tensile load in a cable-handling engine having a series of short cable-gripping devices.

A further object of the invention is to provide deformable load-distributing means for interconnecting a plurality of serially-acting, linearly-translatable, cable-gripping devices in an engine for handling armorless cable.

These and other objects of the invention are attained by providing a cable-handling device, such as a caterpillar cable engine, with load-distributing means for limiting the maximum cable tensile load absorbed by each of its gripping units. In other words, the cable-handling engine is equipped with shear-limiting means at the interface between the cable and the mating section of the oppositely disposed caterpillar track formations of gripping units. These means comprise a yieldable linkage for joining or coupling each gripping unit to its respectively associated track member.

This linkage includes yieldable means in the shape of a deformable connector, such as a spring or the like, having high resistance for loads below an assigned value and essentially no further resistance beyond this value. This construction causes the linkage to yield only slightly while a cable tensile load increment is being absorbed by a gripping unit. When the preassigned load limit is reached, the linkage is designed to yield markedly so as to transfer the remaining load to the next adjacent gripping unit. This process is repeated from one to another of the gripping units along the mating section of the caterpillar tracks until the total cable load is distributed, there being a sufficient number of such units for absorbing the total loading tension. Thus, in order to insure that the slip required to accommodate cable stretch under tension will occur externally to the cable rather than internally at the above-mentioned interfaces inside the cable, a controlled external situation embodying the shear-limiting means of this invention is provided to assure that the slip will occur inside the cable engine.

These and other features of the invention are more fully discussed in connection with the following detailed description of the drawing in which.

Figure 2:
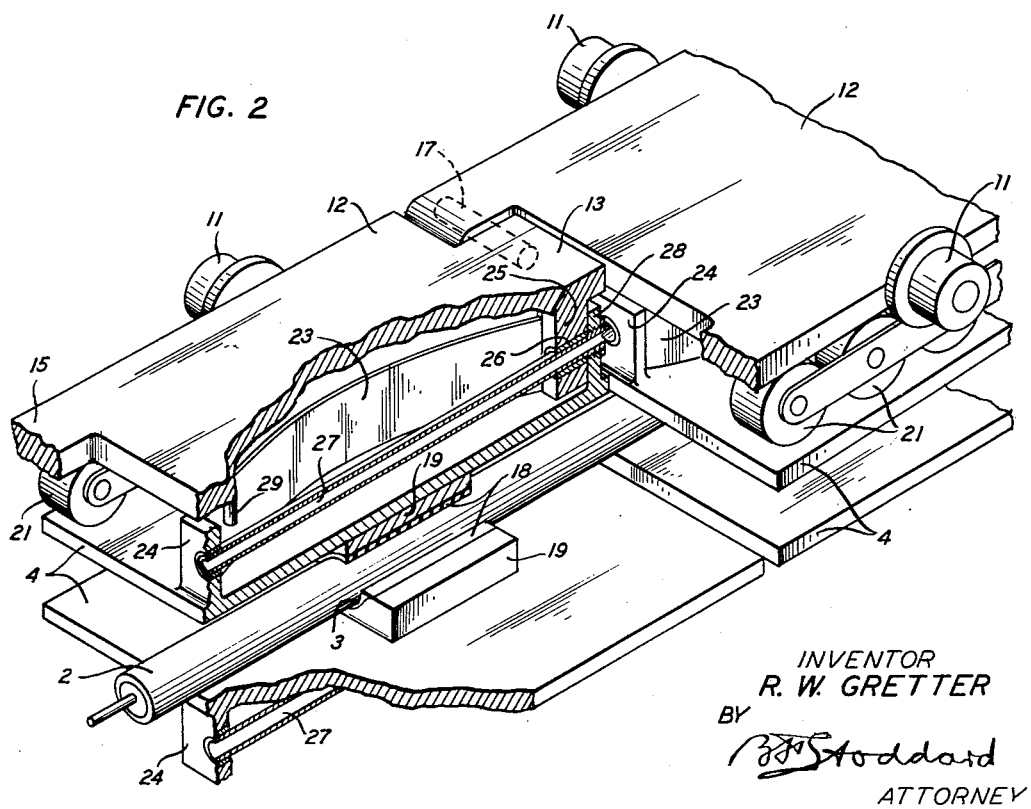
FIG. 2 is a three-dimensional view partly in section of a portion of the lower and upper track formations of gripping units provided with one embodiment of the invention comprising yieldable linkage having deformable connectors in the shape of deflectable columns.

FIG. 3 is a partially sectioned perspective view similar to FIG. 2 but illustrating another embodiment of the invention in which the yieldable linkage includes a plurality of stacks of deflectable dished washers; and FIG. 4 is another partially sectioned perspective view similar to FIG. 2 but showing still another embodiment of the invention in the form of a yieldable linkage employing partially stressed, linearly deflectable, coil springs.

Figure 1:
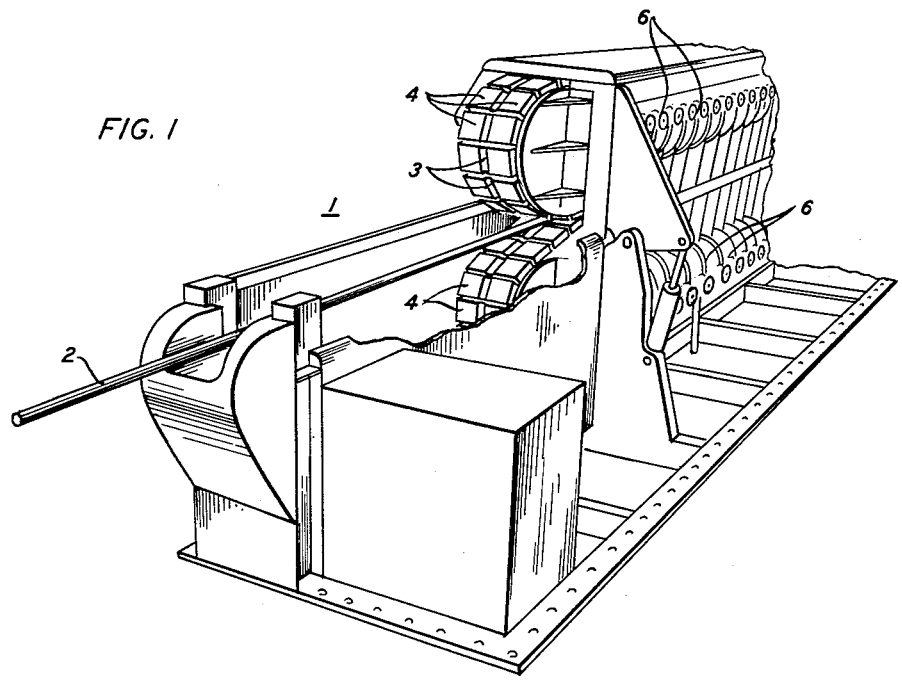
FIG. 1 is a perspective view of one end of a cable-handling engine having oppositely disposed caterpillar track formations of gripping units with which this invention may be employed.

In FIG. 1, a caterpillar cable-handling engine 1 is represented as operating upon an armorless ocean cable 2 of the type described above. For the purpose of simplicity, only one end of the engine 1 has been shown in the drawing because it is essentially similar to the cable engine disclosed in Patent 2,981,454, issued to F. R. Dickinson and H. N. Upthegrove on April 25, 1961, and a complete understanding of its construction and operation may be obtained by reference thereto. As is indicated in the drawing, the cable-handling engine 1 is provided with a first group of cable-gripping units 4 connected in a lower endless track formation and a second group of the same type of cable-gripping units 4 arranged in an upper continuous track formation.

These lower and upper caterpillar track formations of the gripping units 4, which may be in the form of gripper blocks or shoes, are oppositely disposed with respect to each other in such a manner as to form a mating section which engages or grips sides of the cable 2 in order to transfer the tensile load from the cable 2 to the caterpillar engine 1. This mating track section has an appreciable length, such as twenty feet, so that the absorption of the cable load will be distributed among a relatively large number of the individual gripping units 4.

As is described in detail in the above-identified Dickinson-Upthegrove patent, the gripping action of the units 4 in the mating track section is effected by means of two pressurized air manifold systems 6, one being associated with the lower track formation of gripping units 4 and the other being associated with the upper track formation of gripping units 4.

It is to be noted that each of the gripping units 4 is formed with a groove 3 in its face for mating with the contour of the cable 2. These grooves 3 serve to maintain the centering of the cable 2 during its passage through the engine 1. The grooves 3 also assist in equalizing the contact pressure exerted by the gripping units 4 in a direction normal to the cable 2 thereby lessening the possibility of this armorless cable 2 becoming damaged or crushed while traveling through the engine 1.

During the operations of laying or recovering the cable 2, control of its movement is effected by the gripping action exerted on opposite sides thereof by the juxtaposed gripping units 4 which have their lower and upper track formations driven or restrained by any suitable means in the engine 1, such as by large sprocket wheels, operated by an appropriate source of power as, for example, an hydraulic system driven by electric motors. This power source functions as a drive motor in one direction for cable-recovery operations and as a pump in the other direction for use as a brake during cable-laying operations. The power source is further designed to act as a drive motor in the laying direction for pulling cable from the ship's hold until sufficient cable has been overboarded to pull its own weight. The above-mentioned large sprocket wheels, which have not been shown in the drawing for the purpose of simplicity, are adapted to engage a number of flanged rollers or studs 11 mounted in the manner shown in the drawing on the sides of two groups of articulated track members 12 which are arranged in lower and upper endless track formations. The flanged rollers 11 are of such size as to fit properly between the teeth of the sprocket wheels.

In order to join the track members 12 of each group into a continuous caterpillar track formation, one end of each track member 12 in each of the lower and upper groups has its corners cut away to form a tongue portion 13. Each of the side edges of each tongue portion 13 has a hole 14 drilled therein as is best shown in FIG. 3. The other end of each track member 12 is provided at each corner with projecting portions 15 having holes 16 drilled through them. The holes 14 and 16 are of proper size for receiving steel hinge pins 17. As is illustrated in the drawing, the projecting portions 15 of each track member 12 are so shaped as to overlap and mate with the tongue portion 13 of an adjacent track member 12 in such a manner that the holes 14 and 16 will be in alignment.

Due to this mating and overlapping design, each hinge pin 17 passes through the hole 16 in a projecting portion 15 of one track member 12 and also through a correspondingly aligned hole 14 in the tongue portion 13 of an adjacent track member 12 thereby pivotally joining them. Thus, by means of this construction, all of the track members 12 in the upper group are connected into one endless track formation and all of the track members 12 in the lower group are connected into another continuous track formation.

As was stated above, the face portion of each gripping unit 4 has a groove 3 for engaging the cable 2. These grooves 3 may be of somewhat different designs in accordance with various cable-handling requirements. For example, they may be made approximately in the form of a semicircle so as to fit substantially the contour of the cable 2 in the manner indicated in FIGS. 1 and 2. They can also be made in an oblong shape with rounded ends as is represented in FIG. 3. Another form which the grooves 3 may have is that of a shallow, broad V as is illustrated in FIG. 4. The grooves 3 may be provided with a lining 18 of rubber or a similar material as is shown in FIGS. 2 and 4 or, if desired, this lining 18 may be omitted as in FIG. 3.

The size of the face portion of each gripper unit 4 that contains the groove 3 may also be varied in accordance with different cable-handling requirements. This face portion may extend across the entire unit 4 as is indicated in FIGS. 1 and 4. An alternative design is shown in FIG. 2 wherein it can be seen that the groove 3 is formed in a small block 19. If desired, both the length and width of the block 19 may be made larger as is shown in FIG. 3. The block 19 may be a separate piece, as in FIG. 2 and may be secured to the body of the gripper unit 4 in any convenient manner, such as by screws, or it may be formed integrally therewith as is represented in FIG. 3. Another variation in design is to provide the ends of each gripper unit 4 with either straight edges, as in FIG. 3, or with beveled edges as is indicated by the references numeral 20 in FIG. 4.

In accordance with the above-described shear limiting concept of employing load-distributing means for limiting the maximum cable tensile load absorbed by each of the gripping units 4, a limited sliding relationship is established between each gripper unit 4 and its associated track member 12. This is accomplished by making use of the fact that each gripper unit 4 in the upper group is located beneath an associated track member 12 of the upper continuous track while each gripping unit 4 in the lower group is positioned above an associated track member 12 in the lower endless track. These parts may be so constructed as to permit each to slide directly on the other or, alternatively, a plurality of rollers 21 may be interposed between them. These rollers 21 may be mounted or positioned in any of several suitable arrangements, such as the different assemblies shown in FIGS. 2, 3, and 4. Thus, each track member 12 is able to ride or slide over its respectively associated gripper unit 4.

The extent of this sliding relationship between each track member 12 and its associated gripper unit 4 is limited or restricted by connecting or coupling them with a linkage unit including yieldable means so constructed and arranged as to have a high resistance for loads below an assigned value and essentially no further resistance for loads in excess of this value. In other words, each linkage unit is designed to resist relative motion between its associated gripper unit 4 and its associated track member 12 so that it will yield only slightly during the application of the cable tensile load until the gripper unit 4 has absorbed or assumed its assigned share of the total load.

At this point, the linkage unit is designed to yield markedly thereby allowing the gripper unit 4 to move with the cable 2 and the associated track member 12. This causes the next adjacent gripper unit 4 to be subjected to the remaining cable tensile load in a similar manner. The process of distributing limited portions of the load among the gripper units 4 is repeated seriatim along the mating section of the caterpillar tracks until the entire load has been distributed among a relatively large number of the gripper units 4 in both the lower and upper track formations. It is, of course, assumed that the mating track section includes a sufficient number of the gripping units 4 for absorbing the total cable tensile load.

In accordance with the principles of this invention, the yieldable linkage may embody various forms, such as those shown in FIGS. 2, 3 and 4. For example, the linkage illustrated in FIG. 2 employs yieldable means comprising deformable connectors in the shape of deflectable columns 23. The columns 23 are made of a suitable metal so that they are resilient in the same manner as a leaf spring. Each gripper unit 4 in both the upper and lower track formations is provided with two of these spring columns 23 which are retained in an enantiomorphic relationship. One end of each pair of columns 23 is held by a lug 24 located at the middle of one end of a gripper unit 4. The middle of the opposite end of the associated track member 12 is provided with a lug 25 for holding the other end of the pair of columns 23. Thus, each gripper unit 4 and its associated track member 12 may be considered as being connected or linked by the pair of deflectable columns 23 interposed between them.

As is represented in FIG. 2 the lug 25 on the track member 12 is fitted with a bushing 26 which is journaled on a guide rod or tube 27. One end of the guide rod 27 is held by the lug 24 that is at one end of the gripper unit 4. The other end of the guide rod 27 is retained by another lug 28 situated at the middle of the opposite end of the gripper unit 4. This construction serves to guide the relative sliding movement between each gripper unit 4 and its associated track member 12. The extent of this sliding movement is limited in part, as is described hereinafter, by a stop 29 attached to the track member 12.

When no load is applied to a gripper unit 4, its two spring columns 23 push the lug 25 along the guide rod 27 until it abuts against the lug 28 as is shown in FIG. 2. It can also be seen in FIG. 2 that, at this time, the lug 24 is spaced apart from the stop 29 by a short distance.

The application of load tends to produce relative motion between a gripper unit 4 and its associated track member 12, but this tendency toward movement is initially resisted by the columns 23 until the gripper unit 4 has assumed its assigned share of the load. When this occurs, the columns 23 become deflected thereby permitting relative motion to take place between the gripper unit 4 and the track member 12. At this point, the remaining portion of the load will be applied to the next adjacent gripper unit 4 in that track formation and the same action will be repeated. This process continues until the total load has been absorbed by a relatively large number of the gripper units 4. Ordinarily, the cable loads normally handled by the engine 1 will not be so large as to force the lugs 24 into engagement with the stops 29. However, under extreme load conditions, this might occur and, in this event, the stops 29 function to protect the yieldable elements 23 from becoming damaged.

The mating gripper units 4 in the upper and lower track formations move through the engine 1 with the cable 2 until the exit end of the engine 1 is reached. When a pair of upper and lower gripper blocks 4 reach this point, they discontinue their hold upon the cable 2 thereby releasing their share of the load. This portion of the load is then assumed by a pair of upper and lower gripper units 4 at the entrance end of the engine 1 and the process continues until the cable-handling operation is terminated.

The yieldable linkage may, if desired, be in the form of a plurality of stacks of dished spring washers 31 as is represented in FIG. 3. These washers 31 may be stacked or mounted upon the guide rod 27 and can be arranged in oppositely disposed pairs as is indicated in FIG. 3. The washers 31 have the property of resisting deflection until the assigned portion of the load has been absorbed by their associated gripper unit 4. At this point, they are designed to flatten so as to permit relative motion between the gripper unit 4 and its track member 12. The extent of this motion is limited without the assistance of a stop, such as the stop 29 shown in FIG. 2, because, when the washers 31 become flat, their combined mass will function as a stop.

The linkage may employ still another stype of yieldable means in the form of precompressed coil springs 32. These springs 32 may be supported or retained in the manner represented in FIG. 4 wherein it can be seen that the guide rod 27 of FIGS. 2 and 3 has been replaced by two telescoping cylindrical members 33 and 34. The left member 33 is adapted to slide inside the right member 34 which is provided with an internal stop 35. It is to be noted that the gripper unit 4 is not equipped with the lugs 24 and 28 of FIGS. 2 and 3 but is, instead, provided at its left end with a tall lug 36 which is designed to abut against a portion 37 of the track member 12. This lug 36 has a threaded hole for receiving an end of the left telescoping member 33. The right telescoping member 34 has an end secured to a portion 38 of the track member 12.

With no load applied, the spring 32 causes the lug 36 to abut against the left portion 37 of the track member 12. In this condition, the left telescoping member 33 is spaced a short distance from the stop 35.

The application of load is initially resisted by the spring 32 so as to prevent relative motion between the gripper unit 4 and the track member 12. However, when the gripper unit 4 has absorbed its assigned share of the load, relative motion between the gripper unit 4 and the track member 12 will take place thereby forcing or telescoping the left member 33 further inside the right member 34. At this point, the remaining portion of the load is applied to the next adjacent gripping unit 4. The extent of travel of the relative motion between a gripper unit 4 and its associated track member 12 is limited under extreme load conditions by the engagement of the left member 33 with the stop 35.

These embodiments of the invention have been presented for the purpose of explaining its principles and features of operation. It is to be understood that the invention is not to be restricted to these embodiments as various modifications may be made without exceeding the scope of the invention. For example, the distribution of controlled tension may also be accomplished by using a multiplicity of short caterpillar units instead of a single, long caterpillar engine. Ten or fifteen of these short caterpillar units could be used in tandem with local distortion of the cable being avoided by limiting the tension assumed by any one of these units.

What is claimed is:

1. An engine for handling a cable subjected to a tensile load, said engine having control means for controlling movement of a cable, said control means including a plurality of units each adapted to engage a cable for transferring at least a portion of the cable tensile load to said engine, said control means further including movable means for regulating movement of said units, load-distributing means for limiting the maximum amount of cable tensile load transferred from a cable to said engine by any one of said units, said load-distributing means comprising a plurality of linkage means each connecting a respectively different one of said units to said movable means for sliding motion with respect thereto in the direction of movement of a cable controlled by said engine, each of said linkage means including yieldable means having high resistance for tensile loads below an assigned value and essentially no further resistance for tensile loads in excess of this value.

2. A cable-handling engine in accordance with claim 1 wherein said yieldable means comprises a deformable connector, said deformable connector being interposed longitudinally between said movable means and one of said units.

3. A cable-handling engine in accordance with claim 1 wherein said yieldable means comprises a deflectable column horizontally disposed between said movable means and one of said units.

4. A cable-handling engine in accordance with claim 1 wherein said yieldable means comprises a plurality of deflectable dished washers mounted in a column having its longitudinal axis parallel to the path of movement of a cable controlled by said engine.

5. A cable-handling engine in accordance with claim 1 wherein said yieldable means comprises a partially stressed, linearly deflectable, coil spring mounted with its longitudinal axis parallel to the path of movement of a cable controlled by said engine.

6. A cable-handling engine comprising cable-translating means disposed in the form of a continuous loop and having an extended linear portion adapted to engage a cable for controlling its passage through the engine, said translating means including a series of articulated track members and a plurality of serially arranged cable-gripping units, each of said gripping units being so constructed and arranged as to engage a cable at one end of said linear portion and to maintain said engagement to the other end thereof, and a linkage connecting each of said gripping units to a respectively different one of said track members for sliding movement with respect thereto, said linkage including instrumentalities for restricting said sliding movement to a path of travel parallel to said linear portion of said translating means.

7. Equipment for handling cable, said equipment comprising a series of linearly movable members, a plurality of gripping devices adapted to grip a cable, coupling means for coupling each of said gripping devices to a respectively different one of said movable members for relative sliding motion therebetween in a direction parallel to the direction of movement of said linearly movable members, and means for limiting the extent of the relative sliding motion between any one of said gripping devices and its respectively associated movable member.

8. A cable-handling engine for handling cable subjected to a tensile load, said engine comprising a linearly movable series of articulated track members, a series of movable cable-gripping devices for gripping a cable, each of said devices being disposed in sliding relationship with a respectively different one of said track members, the sliding of said devices being in the same direction as the linear movement of said track members, and means for limiting the extent of each of said sliding relationships, said means including a plurality of linkage units each interposed between a respectively different one of said gripping devices and its associated track member, each of said linkage units being constructed and arranged to yield to a limited extent in response to the application of cable tensile load to its associated gripping device.

References Cited in the file of this patent

UNITED STATES PATENTS

| | | |
|---|---|---|
| 2,438,448 | Morton et al. | Mar. 23, 1948 |
| 2,696,907 | Fisk | Dec. 14, 1954 |
| 2,792,930 | Graham | May 21, 1957 |